US010445756B2

(12) United States Patent
Gonen et al.

(10) Patent No.: US 10,445,756 B2
(45) Date of Patent: *Oct. 15, 2019

(54) SYSTEM AND METHOD FOR MANAGING AN INCENTIVE-BASED RECYCLING PROGRAM

(75) Inventors: Ron Gonen, New York, NY (US); Morley Ivers, Toronto (CA)

(73) Assignee: RECYCLEBANK LLC, New York, NY (US)

( * ) Notice: Subject to any disclaimer, the term of this patent is extended or adjusted under 35 U.S.C. 154(b) by 1390 days.

This patent is subject to a terminal disclaimer.

(21) Appl. No.: 12/354,504

(22) Filed: Jan. 15, 2009

(65) Prior Publication Data

US 2009/0138358 A1 May 28, 2009

Related U.S. Application Data

(63) Continuation-in-part of application No. 11/345,867, filed on Feb. 2, 2006, now Pat. No. 7,949,557, and a (Continued)

(51) Int. Cl.
*G06Q 30/00* (2012.01)
*G06Q 30/02* (2012.01)
*G06Q 10/08* (2012.01)

(52) U.S. Cl.
CPC ......... *G06Q 30/0207* (2013.01); *G06Q 10/08* (2013.01); *G06Q 30/00* (2013.01); *G06Q 30/0256* (2013.01)

(58) Field of Classification Search
CPC ..................... G06C 30/207; G06Q 30/207
(Continued)

(56) References Cited

U.S. PATENT DOCUMENTS 4,248,334 A 2/1981 Hanley et al.
4,949,528 A 8/1990 Palik
(Continued)

FOREIGN PATENT DOCUMENTS

JP 2001312551 11/2001
JP 2002073896 A 3/2002
(Continued)

OTHER PUBLICATIONS

International Search Report and Written Opinion, PCT/US2009/031129, dated Jun. 16, 2009, 14 pages.
(Continued)

*Primary Examiner* — Matthew L Hamilton
(74) *Attorney, Agent, or Firm* — John Maldjian; Maldjian Law Group LLC

(57) ABSTRACT

Embodiments of the present invention generally relate to a system and method for managing an incentive-based recycling program. More specifically, embodiments of the present invention relate to managing an incentive-based recycling program through administering a dynamic customer loyalty rewards program associated therewith. In one embodiment of the present invention, a method of managing an incentive-based recycling system comprises inputting customer data into a collective database, and generating a customer account, inputting hauler data into the collective database, and generating a hauler account, inputting vendor data into the collective database, and generating a vendor account, recording a recycling activity associated with a customer account on the collective database, allocating credits to a customer account, in an amount correlating to the recycling activity associated with the customer account, on the collective database, and enabling the customer to manage the credits associated with the customer account.

16 Claims, 3 Drawing Sheets

Related U.S. Application Data continuation-in-part of application No. 11/854,387, filed on Sep. 12, 2007.

(60) Provisional application No. 61/021,301, filed on Jan. 15, 2008, provisional application No. 60/650,610, filed on Feb. 7, 2005.

(58) Field of Classification Search
USPC ........................................................ 705/14
See application file for complete search history.

(56) References Cited

U.S. PATENT DOCUMENTS

| | | | |
|---|---|---|---|
| 5,035,564 A | 7/1991 | Matsumoto | |
| 5,072,833 A | 12/1991 | Hansen et al. | |
| 5,209,312 A | 5/1993 | Jensen | |
| 5,209,361 A | 5/1993 | Grubb, Jr. | |
| 5,230,393 A | 7/1993 | Mezey | |
| 5,237,507 A | 8/1993 | Chasek | |
| 5,251,761 A | 10/1993 | Hansen et al. | |
| 5,304,744 A | 4/1994 | Jensen | |
| 5,333,984 A | 8/1994 | Bayne et al. | |
| 5,355,987 A | 10/1994 | Dewoolfson et al. | |
| 5,416,279 A | 5/1995 | Tseng | |
| 5,425,456 A | 6/1995 | Erikson | |
| 5,447,017 A | 9/1995 | Becher et al. | |
| 5,484,246 A | 1/1996 | Horning et al. | |
| 5,628,412 A | 5/1997 | Hulls | |
| 5,699,525 A | 12/1997 | Enbutsu et al. | |
| 5,704,558 A | 1/1998 | Arrott | |
| 5,833,429 A | 11/1998 | McNeilus et al. | |
| 5,837,945 A | 11/1998 | Cornwell et al. | |
| 5,842,652 A | 12/1998 | Warsing et al. | |
| 5,871,114 A | 2/1999 | Anderson et al. | |
| 5,923,016 A | 7/1999 | Fredregill et al. | |
| 5,934,867 A | 8/1999 | Christenson | |
| 5,960,402 A | 9/1999 | Embutsu et al. | |
| 5,965,858 A | 10/1999 | Suzuki et al. | |
| 5,983,198 A | 11/1999 | Mowery et al. | |
| 6,026,370 A | 2/2000 | Jermyn | |
| 6,055,573 A | 4/2000 | Gardenswartz et al. | |
| 6,292,785 B1 | 9/2001 | McEvoy et al. | |
| 6,496,804 B2 | 2/2002 | McEvoy et al. | |
| 6,448,898 B1 | 9/2002 | Kasik | |
| 6,663,004 B2 | 12/2003 | Wagner et al. | |
| 6,664,897 B2 | 12/2003 | Pape et al. | |
| 6,718,343 B2 | 4/2004 | Kamata | |
| 6,952,625 B2 | 10/2005 | Uetake et al. | |
| 6,993,712 B2 | 1/2006 | Ramachandran et al. | |
| 7,032,820 B2 | 4/2006 | Kreiner et al. | |
| 7,133,895 B1 | 11/2006 | Lee et al. | |
| 7,134,084 B1 | 11/2006 | Rashid et al. | |
| 7,136,865 B1 | 11/2006 | Ra et al. | |
| 7,167,836 B2 | 1/2007 | Gottselig et al. | |
| 7,251,620 B2 | 7/2007 | Walker et al. | |
| 7,267,262 B1 | 9/2007 | Brown | |
| 7,313,602 B2 | 12/2007 | Ono et al. | |
| 7,398,225 B2 | 7/2008 | Voltmer et al. | |
| 7,398,226 B2 | 7/2008 | Haines et al. | |
| 7,398,248 B2 | 7/2008 | Phillips et al. | |
| 7,424,441 B2 | 9/2008 | George et al. | |
| 7,428,498 B2 | 9/2008 | Voltmer et al. | |
| 7,496,524 B2 | 2/2009 | Voltmer et al. | |
| 7,689,682 B1 | 3/2010 | Eldering et al. | |
| 7,999,688 B2 | 8/2011 | Healey et al. | |
| 8,138,923 B2 | 3/2012 | Grunwald et al. | |
| 2001/0037451 A1* | 11/2001 | Bhagavatula et al. ........ 713/155 | |
| 2001/0047299 A1 | 11/2001 | Brewer et al. | |
| 2002/0026326 A1 | 2/2002 | Stevens | |
| 2002/0040564 A1 | 4/2002 | Killingbeck et al. | |
| 2002/0082920 A1 | 6/2002 | Austin et al. | |
| 2002/0188509 A1 | 12/2002 | Ariff et al. | |
| 2003/0040854 A1 | 2/2003 | Rendahl et al. | |
| 2003/0055723 A1 | 3/2003 | English | |
| 2003/0065610 A1 | 4/2003 | Brown et al. | |
| 2003/0115097 A1 | 6/2003 | Sokei et al. | |
| 2003/0139981 A1 | 7/2003 | Mizuno et al. | |
| 2003/0158818 A1 | 8/2003 | George et al. | |
| 2003/0233278 A1 | 12/2003 | Marshall | |
| 2004/0049424 A1 | 3/2004 | Murray et al. | |
| 2004/0083216 A1 | 4/2004 | Kozam et al. | |
| 2004/0143355 A1 | 7/2004 | Uetake et al. | |
| 2004/0167799 A1* | 8/2004 | Berry ................................ 705/1 |
| 2004/0199401 A1 | 10/2004 | Wagner et al. | |
| 2004/0199545 A1 | 10/2004 | Wagner et al. | |
| 2004/0200689 A1* | 10/2004 | Compton et al. ............. 194/210 |
| 2004/0243468 A1 | 12/2004 | Cohagan et al. | |
| 2005/0027597 A1 | 2/2005 | Peterson | |
| 2005/0038572 A1* | 2/2005 | Krupowicz ................... 700/305 |
| 2005/0043963 A1 | 2/2005 | Soga et al. | |
| 2005/0059849 A1 | 3/2005 | Liu | |
| 2005/0080520 A1 | 4/2005 | Kline et al. | |
| 2005/0131757 A1 | 6/2005 | Chan et al. | |
| 2005/0192963 A1 | 9/2005 | Tshiegg et al. | |
| 2005/0216369 A1* | 9/2005 | Honegger ....................... 705/28 |
| 2005/0256767 A1 | 11/2005 | Friedman | |
| 2005/0267806 A1 | 12/2005 | Tano | |
| 2005/0273340 A1 | 12/2005 | Yamamoto | |
| 2006/0069588 A1 | 3/2006 | Ritter | |
| 2006/0080819 A1 | 4/2006 | McAllister | |
| 2006/0178933 A1 | 8/2006 | FitzGerald et al. | |
| 2006/0224450 A1 | 10/2006 | Moon | |
| 2006/0253407 A1 | 11/2006 | Waddell et al. | |
| 2006/0271423 A1* | 11/2006 | Hiranoya ....................... 705/14 |
| 2006/0273180 A1 | 12/2006 | Ammond et al. | |
| 2007/0100694 A1 | 5/2007 | Kopps | |
| 2007/0102506 A1 | 5/2007 | Stevens | |
| 2007/0112632 A1 | 5/2007 | Voltmer et al. | |
| 2007/0174073 A1 | 7/2007 | Hunscher et al. | |
| 2007/0219862 A1* | 9/2007 | Casella ................. B65F 1/1484 |
| | | | 705/14.11 |
| 2007/0260466 A1 | 11/2007 | Casella et al. | |
| 2007/0291323 A1 | 12/2007 | Roncal | |
| 2008/0041996 A1 | 2/2008 | Shaw et al. | |
| 2008/0061124 A1 | 3/2008 | Langlois et al. | |
| 2008/0061125 A1 | 3/2008 | Langlois et al. | |
| 2008/0069641 A1 | 3/2008 | Kreiner et al. | |
| 2008/0077498 A1 | 3/2008 | Ariff et al. | |
| 2008/0077499 A1 | 3/2008 | Ariff et al. | |
| 2008/0086411 A1 | 4/2008 | Olson et al. | |
| 2008/0169342 A1 | 7/2008 | Gonen et al. | |
| 2008/0183634 A1 | 7/2008 | Sadler | |
| 2008/0208721 A1 | 8/2008 | Bertogg | |
| 2008/0320139 A1 | 8/2008 | Fukuda et al. | |
| 2008/0275772 A1 | 11/2008 | Suryanarayana et al. | |
| 2009/0125402 A1 | 5/2009 | Voltmer et al. | |
| 2009/0132641 A1 | 5/2009 | Sanguinetti et al. | |
| 2009/0138358 A1 | 5/2009 | Gonen et al. | |
| 2009/0228406 A1 | 9/2009 | Lopez et al. | |
| 2011/0258128 A1 | 10/2011 | Hambleton | |
| 2015/0154568 A1 | 6/2015 | Gu | |

FOREIGN PATENT DOCUMENTS

| | | |
|---|---|---|
| JP | 2002-297840 | 10/2002 |
| JP | 13195496 | 10/2002 |
| JP | 2003-099520 | 4/2003 |
| JP | 2005-008339 | 1/2005 |
| KR | 1020020084880 | 11/2002 |
| KR | 1020060099489 | 9/2006 |
| KR | 10-2008-008694 | 1/2008 |
| KR | 10-2008-00132246 | 2/2008 |
| WO | 2002096780 A2 | 12/2002 |

OTHER PUBLICATIONS

Intl' Search Report and Written Opinion for PCT/2007/079440 dated Apr. 23, 2008, 10 pages.

Intl' Search Report and Written Opinion for PCT/2008/055687 dated Aug. 20, 2008, 9 pages.

Int'l Search Report and Written Opinion for PCT/2008/055689 dated Jul. 17, 2008, 10 pages.

(56) References Cited

OTHER PUBLICATIONS

Int'l Search Report and Written Opinion for PCT/2008/074647 dated Mar. 25, 2009, 8 pages.
World Economic Forum Names RecycleBank a 2009 Technology Pioneer found at http://Corporate.RecycleBank.com/press-release . . . Dec. 4, 2008, 4 pages.
Peretsman, Natalie, "Rewarding Recycling," Scienceline, Jun. 12, 2008, (5 pgs).
Colimore, Edward, "Cherry Hill Starts Cashing in on Recycling," The Philadelphia Inquirer, Jun. 30, 2008, (2 pgs.).
Hays, Julia, "Hauler: New Recycling Program Runs Smoothly," Courier-Post, Jul. 1, 2008, (2 pgs).
It's Easy Being Green: It Pays to Recycle, Center for American Progress, Jul. 16, 2008, (2 pgs).
Satullo, Chris, "The Right Kind of 'Nudge' Improves Life for Citizens," The Philadelphia Inquirer, Jul. 20, 2008, (2 pgs).
Glick, Alexis, "Talking Trash.. Literally," The Glick Report, Fox Business, Jul. 31, 2008 (1 pg).
Judkis, Maura, "4 Ways to Earn Cash for Recycling," U.S. News & World Report, Jul. 30, 2008 (2 pgs.).
Knoblauch, Jessica A., "Turning Your Trash Into Cash," Plenty Magazine, (3 pgs).
Siegel, Robert, "What's Behind a Patchwork of Recycling Rules?" NPR, Jul. 28, 2008 (3 pgs).
Laidler, John, "Residents Find Recycling Has Its Just Reward," The Boston Globe, Jul. 27, 2008 (2 pgs).
Jones, Charisse, "Residents Reap Rewards for Recycling," USA Today, Jul. 9, 2008 (3 pgs).
Wong, Wylie, "Going Green," Biztech Magazine, Mar. 2008, found at http://www.biztechmagazine.com/article. asp?itemjd=397, (3pgs).
Walsh, Bryan, "Making Recycling Really Pay," Time Magazine, Apr. 11, 2008, found at http://www.time.com/time/health/article/0,8599,1730187,00.html?xid=rss-health, (2 pgs).
Gunther, Marc, "Turning Trash Into Cash," Fortune Magazine, Sep. 20, 2007, found at http://money.cnn.com/2007/09/20/magazines/fortune/recyclebankfortune/index.htm, (3 pgs).
"Bags to Riches," Good Magazine, Mar./Apr. 2007, (1 pg).
Desimone, Bonnie, "Rewarding Recyclers, and Finding Gold in the Garbage," The New York Times, Feb. 21, 2006, found at http://www.nytimes.com/2006/02/21/business/businessspecia1/21recycle.html?_r=2&ore, (3 pgs).
4 Ways to Earn Cash for Recycling, US News and World Report, Jul. 31, 2008, (2 pgs).
Special Report: RecycleBank set for the UK? Letsrecycle.com, Jul. 25, 2008, (4 pgs).
New 'American Scrap Coalition' Will Address Global Trade Barriers, Reuters, Jun. 12, 2008, (2 pgs).
"Technology Pioneers 2009," World Economic Forum, (36 pgs).
Desai, Anuj et al., "The Plenty 20 Awards for 2008," (4 pgs).
Jenny Mero, "Wasteful Thinking," Fortune Magazine, Apr. 2008 (1 pg).
*Card Verification Solutions* vs. *Citigroup Inc*, patent infringement suit against US5826245, United States District Court for the Northern District of Illinois Eastern Division, Case No. 13C6339, Judge Virginia M. Kendall, Sep. 29, 2014, 11 pages.

* cited by examiner

SYSTEM AND METHOD FOR MANAGING AN INCENTIVE-BASED RECYCLING PROGRAM

CROSS-REFERENCE TO RELATED APPLICATIONS

This application is a continuation-in-part of U.S. patent application Ser. No. 11/345,867, filed Feb. 2, 2006, which claims the benefit of U.S. Provisional Patent Application Ser. No. 60/650,610, filed Feb. 7, 2005, the disclosures of which are incorporated herein by reference in their entireties. This application is also a continuation-in-part of U.S. patent application Ser. No. 11/854,387, filed Sep. 12, 2007, the disclosure of which is incorporated herein by reference in its entirety. This application also claims the benefit of U.S. Provisional Patent Application Ser. No. 61/021,301, filed Jan. 15, 2008, the disclosure of which is incorporated herein by reference in its entirety.

BACKGROUND

Field of the Invention

Embodiments of the present invention generally relate to a system and method for managing an incentive-based recycling program. More specifically, embodiments of the present invention relate to managing an incentive-based recycling program through administering a dynamic customer loyalty rewards program associated therewith.

Description of the Related Art

Over the past few decades, costs for collecting and disposing waste material ("waste") have skyrocketed. Decreases in available landfill capacity have caused the cost associated with disposing of waste in such landfills to increase. Adding to these costs are governmental (e.g., federal, state and local) landfill taxes, which have also increased sharply over the past few decades.

Even where landfill capacity exists, the cost associated with potential and actual environmental hazards associated with landfill operation are likewise increasing. These costs can include, for example, losses of valuable property and environmental cleanup costs for rehabilitating landfills and surrounding areas that become contaminated with dangerous chemicals due to the disposal and decomposition of the waste. Given the financial and environmental burdens associated with the collection and disposal of waste, municipalities have actively pursued recycling as an alternative to disposal.

Fortunately, demand for recyclable material has increased as a result of expansion in manufacturing. Manufacturers have long recognized that manufacturing goods from recyclable material is less costly than manufacturing such goods from virgin material due to, for example, the costs associated with extracting and processing the virgin material into useable form.

Advances in Single Stream Recycling (SSR) technology reduce the cost of recycling. In addition, recent improvements in automated separation of commingled recyclable material at processing centers have dramatically reduced the cost of collecting, sorting, and processing the recyclable material. The combination of the SSR technology and automated separation enables an automated process to separate and process commingled recyclable material (for example, cardboard, paper, plastic, glass and aluminum material). This combination enables and permits processing centers to cut costs (e.g., reduce labor costs and sorting time) by using an automated process, as opposed to manual labor, to separate the recyclables. In addition, the combination enables municipalities to cut cost of collection by collecting the recyclable material in commingled form.

While information-technology tools have revolutionized the way many governments and industries operate, the waste management industry has not embraced information technology in the same way. As such, the waste management industry lacks modern, up-to-date information technology tools for efficiently carrying out business management, operations management and other activities associated with recycling (collectively "recycling activities"). In turn, the lack of information-technology tools has limited municipalities and/or other entities administering recycling programs to provide incentives for entities, such as business, governments and households, to recycle, to design effective strategies for recycling, to measure performance against such recycling strategies, and the like.

Recycling reduces the financial and environmental burdens of waste disposal, reduces energy costs, and conserves our environments resources. Therefore, there is a need to establish recycling initiatives that recognize the existing problems associated with the disposal of waste and promote recycling efforts as part of a waste management program.

SUMMARY

Embodiments of the present invention generally relate to a system and method for managing an incentive-based recycling program. More specifically, embodiments of the present invention relate to managing an incentive-based recycling program through administering a dynamic customer loyalty rewards program associated therewith. In one embodiment of the present invention, a method of managing an incentive-based recycling system comprises inputting customer data into a collective database, and generating a customer account, inputting hauler data into the collective database, and generating a hauler account, inputting vendor data into the collective database, and generating a vendor account, recording a recycling activity associated with a customer account on the collective database, allocating credits to a customer account, in an amount correlating to the recycling activity associated with the customer account, on the collective database, and enabling the customer to manage the credits associated with the customer account.

In another embodiment, a tangible computer readable medium comprises program instructions, wherein the program instructions are computer-executable to implement: inputting customer data into a collective database, and generating a customer account; inputting hauler data into the collective database, and generating a hauler account; inputting vendor data into the collective database, and generating a vendor account; recording a recycling activity associated with a customer account on the collective database; allocating credits to a customer account, in an amount correlating to the recycling activity associated with the customer account, on the collective database; and enabling the customer to manage the credits associated with the customer account.

In yet another embodiment, an incentive-based recycling system comprises a server accessible via a global computer network comprising a tangible computer readable medium comprising program instructions, wherein the program instructions are computer-executable to implement: inputting customer data into a collective database, and generating a customer account; inputting hauler data into the collective database, and generating a hauler account; inputting vendor data into the collective database, and generating a vendor account; recording a recycling activity associated with a customer account on the collective database; allocating credits to a customer account, in an amount correlating to the recycling activity associated with the customer account, on the collective database; and enabling the customer to manage the credits associated with the customer account.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
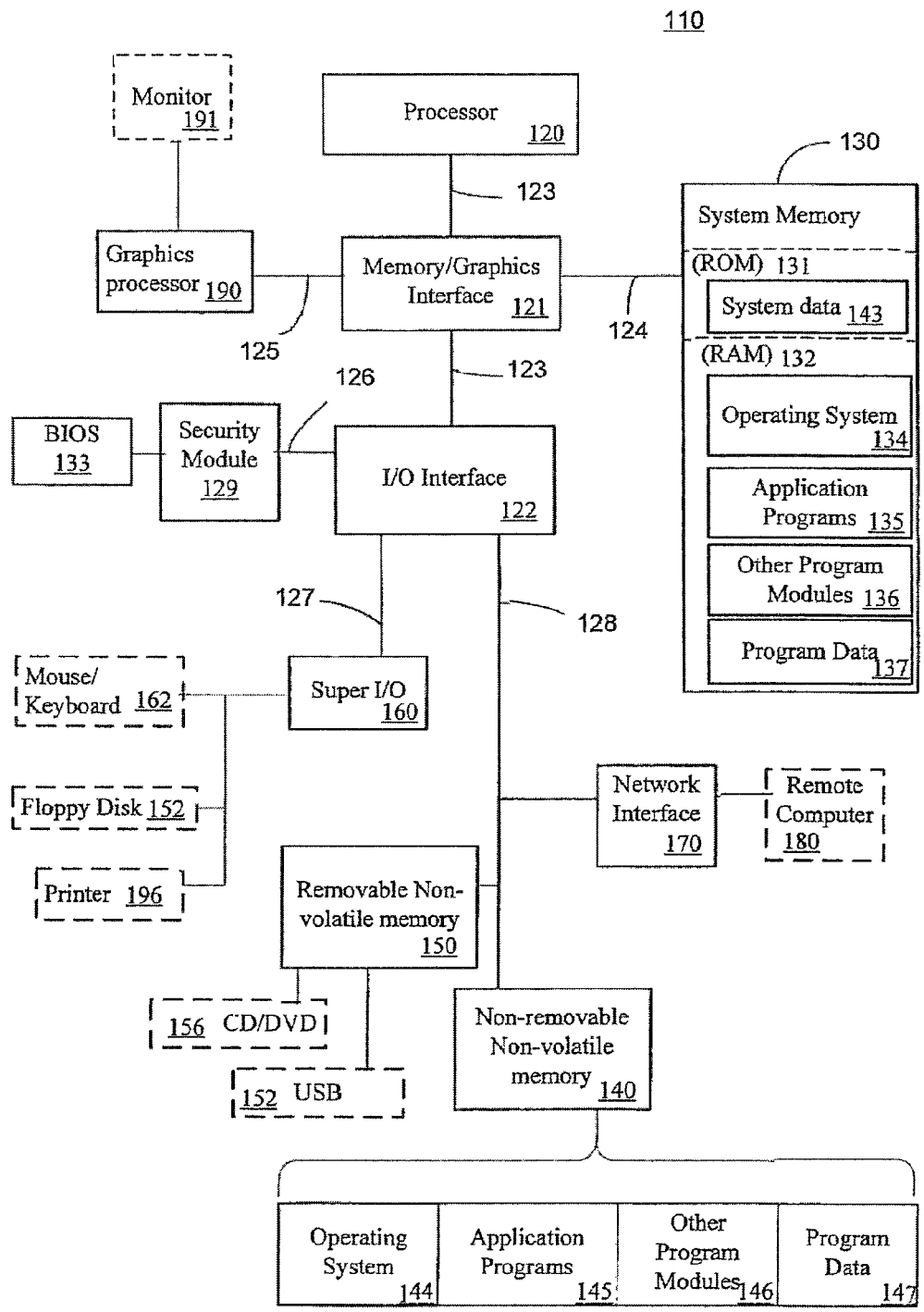
FIG. 1 depicts a block diagram of a general computer system in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

In the following detailed description, numerous specific details are set forth in order to provide a thorough understanding of exemplary embodiments or other examples described herein. However, it will be understood that these examples may be practiced without the specific details. In other instances, well-known methods, procedures, and components have not been described in detail, so as to not obscure the following description. Furthermore, the examples disclosed herein are for exemplary purposes only and other examples may be employed in lieu of, or in combination with, the examples disclosed.

Embodiments of the present invention generally relate to a system and method for managing an incentive-based recycling program. More specifically, embodiments of the present invention relate to managing an incentive-based recycling program through administering a dynamic customer loyalty rewards program associated therewith.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110.

A serial peripheral interface (SPI) bus 126 may connect to a basic input/output system (BIOS) memory 133 containing the basic routines that help to transfer information between elements within computer 110, such as during start-up.

In some embodiments, a security module 129 may be incorporated to manage metering, billing, and enforcement of policies.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a low pin count (LPC) bus, in some embodiments. The super I/O chip 160 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
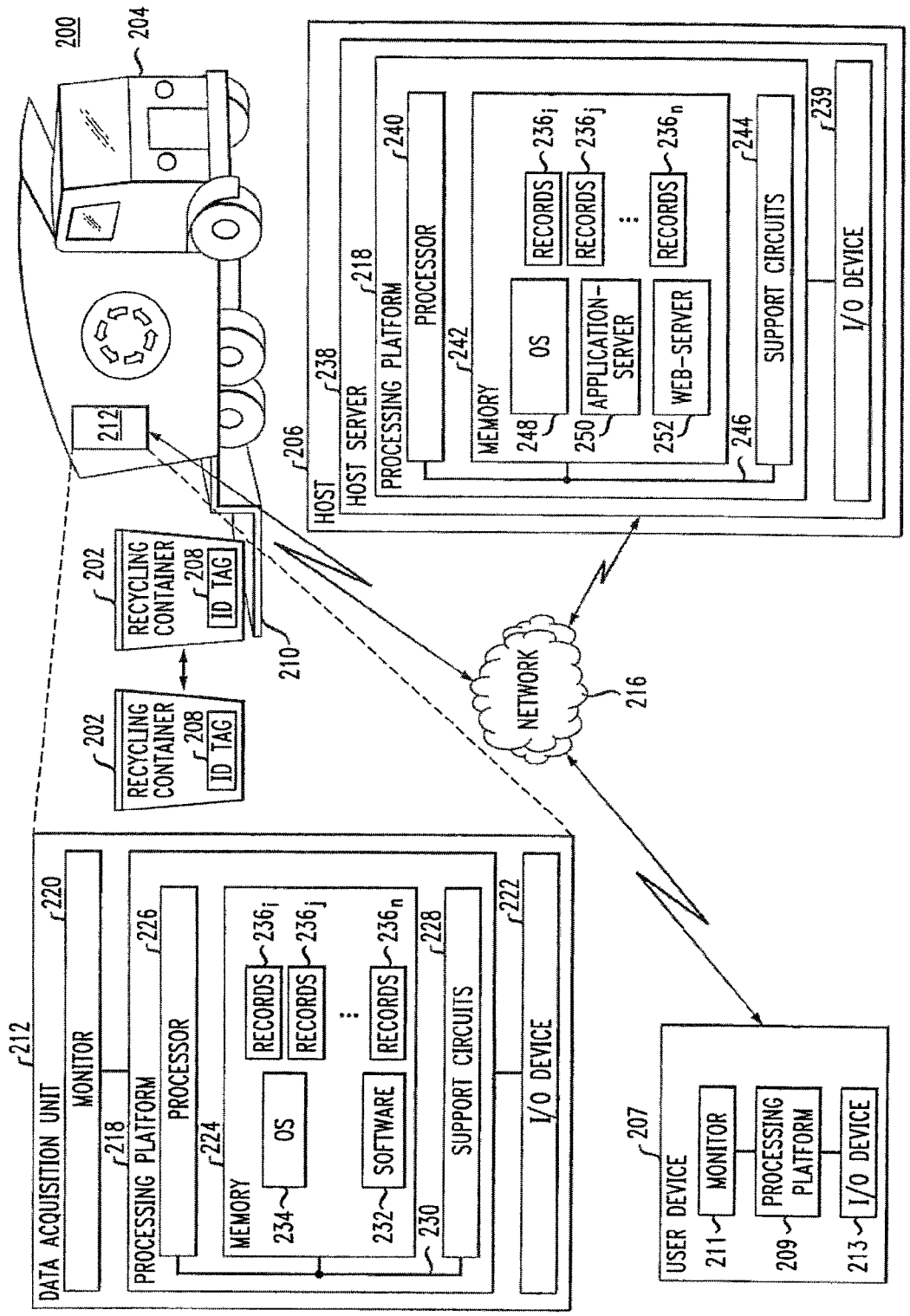
FIG. 2 depicts an exemplary system for recycling recyclable material in accordance with one embodiment of the present invention.

FIG. 2 depicts an exemplary system for recycling recyclable material in accordance with one embodiment of the present invention. The system includes recycling container 202, a collection vehicle 204, a host 206 and a user device 207.

The recycling container 202 is adapted to accept recyclable material deposited by an entity ("deposited material") for collection. The deposited material may include one type of or any combination of types of recyclable material, including, for example, cardboard, paper, plastic, glass, aluminum, organic, or any other material not suitable for landfills. The recycling container 202 may be of any shape or size so long as it is adapted to hold a quantifiable measure of the deposited material. The recycling container 202 may be provided to an entity for a fee (e.g., a one-time, fixed, rental, deposit, or other type of fee) or for free (e.g., on loan or given outright).

The recycling container 202 includes an identification tag 208 for identifying the recycling container 202. The identification tag 208 may be used to track each collection of the deposited material. The identification tag 208 may be machine-readable device, such as a bar-code label, a magnetic-strip device, a radio-frequency-identification ("RFID") tag and the like; and may include and/or be programmed with information for identifying the recycling container 202, and in turn, information (e.g., an address, an account, etc.) associated with the entity ("entity information").

The identification tag 208 may also be a non-machine readable label or other non-machine readable device. As such, the identification tag 208 may include an identifier that can be transferred to (e.g., manually entered into) the host 206, which in turn, uses the identifier to obtain information stored thereon for identifying the recycling container 202 and the entity information.

The collection vehicle 204 may be any device or system capable of collecting recyclable material. The collection vehicle 204 may be automobile or truck, as shown in FIG. 2. Additionally, the collection vehicle 204 may be an interactive terminal (i.e., a kiosk) adapted to receive the recyclable materials from the recycling container 202, or a processing center capable of receiving recyclable materials. The collection vehicle 204 may include a load determining device 210 and a data acquisition unit 212. The load determining device 210 may include any of, any multiple of, any combination of or any combination of multiples of a scale, load cell, load-cell system, a counting device and/or system or other measuring apparatus or system for (i) determining a quantifiable measure (e.g., weight, quantity, etc.) of the deposited material and/or (ii) transferring such quantifiable measure ("deposited-material measure") to the data-acquisition unit 212 for storage and/or subsequent processing.

In many embodiments, the load determining device 210 determines a quantifiable measure as a function of weight measurements from at least one recycling container 202 obtained before and after the deposited material is transferred to the collection vehicle 204. The load determining device 210 may also determine the deposited-material measure as a function of quantities of the deposited material in recycling container 202 before and after such material are transferred to the collection vehicle 204. The load determining device 210 may determine the deposited-material measure in other ways as well. In one embodiment, the load determining device 210 determines a collective quantifiable measure of a plurality of deposited material from a plurality of recycling containers 202 obtained from a plurality of entities.

Some or the entire load determining device 210 may be coupled (e.g., affixed or removably attached) to the collection vehicle 204. For example, all or portions of the load determining device 210 may be coupled to a rear end of an automobile collection vehicle 204. Additionally, a load determining device 210 may be coupled to a base of a kiosk, or be integral with a processing center. Also, all or portions of the load determining device 210 may be removably attached to the collection vehicle 204.

The data-acquisition unit 212 and host 206 may communicatively coupled together via a link or network (collectively "network") 216. This way, the data-acquisition unit 212 and host 206 may exchange information via one or more communications carried over the network 216.

The network 216 may be a partial or full deployment of most any communication/computer network or link, including any of, any multiple of, any combination of or any combination of multiples of a public or private, terrestrial wireless or satellite, and wireline networks or links. The network 216 may include, for example, network elements from a Public Switch Telephone Network ("PSTN"), the Internet, core and proprietary public networks, wireless voice and packet-data networks, such as 1G, 2G, 2.5G and 3G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like; and/or communication links, such as Universal Serial Bus ("USB") links; parallel port links, Firewire links, RS-232 links, RS-485 links, Controller-Area Network ("CAN") links, and the like.

The network elements and/or communication links may include circuit-switched as well as packet-data elements to provide transport of content, triggers and/or other information; and may be configured to communicate such information using any number of protocols and in any manner consistent with exchanging such information among data-acquisition unit 212 and host 206. These protocols may include standardized, proprietary, open-source, and freely-available communication protocols for communicating content in circuit-switching and/or packet data networks, and the like.

The data acquisition unit 212 may be, for example, any of or any combination of a general computer (for example, the computer of FIG. 1); personal computer; a portable computer, a handheld computer; a mobile phone, a digital assistant, a personal digital assistant, a cellular phone, a smart phone, a pager, a digital tablet, a laptop computer, an Internet appliance and the like. In general, the data acquisition unit 212 includes a processor-based platform that operates on any suitable operating system, such as Microsoft® Windows®, Linux and/or Symbian; and that is capable of executing software.

Additionally, the data acquisition unit 212 may be formed in a single unitary device and concentrated on a single server, client, peer or other type node. Alternatively, the data acquisition unit 212 may be formed from one or more separate devices, and as such, may be distributed among a number of server, client, peer or other type nodes. The data acquisition unit 212 may also be scalable (i.e., may employ scale-up and/or scale-out approaches).

The data acquisition unit 212 may include a large number of elements; most of which are not shown in FIG. 2 for simplicity of exposition. As shown, the data acquisition unit 212 includes a processing platform 218 that is operable to control, manipulate or otherwise interact with a monitor 220 or other display device (collectively "monitor") and/or an input/output ("I/O") device 222, via respective couplings.

The monitor 220 may be any suitable device that displays viewable images and/or text generated by the processing platform 218. For instance, the monitor 220 may be any of or any combination of a liquid-crystal-display based monitor, a cathode ray tube monitor, a plasma display monitor, a surface-conduction electron-emitter display monitor, an organic light-emitting diode display monitor, or any other monitor that can display viewable images using television and/or computer protocols, such as Super Video Graphics Array, Digital Visual Interface, Phase Alternating Line, SECAM, NTSC, etc.

The I/O device 222 may be any device that accepts input from a user (man or machine) to control, manipulate or otherwise interact with the operation of the processing platform 218. In addition, the I/O device 222 may be adapted to obtain from the identification tag 208 the entity information and/or identifier that identifies the recycling container 202. Examples of the I/O device 220 include any of or any combination of pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad; a reader, such as a bar-code reader, a magnetic-strip reader, a RFID reader, and the like. Although shown as a single device, the I/O device 222 may be separated into two or more devices; each of which may have, as compared to the I/O device 222, reduced, increased or equivalent functionality. In addition, the I/O device 222 and the monitor 220 may be integrated or otherwise combined together in a single device and/or housing.

The processing platform 218 includes memory 224, one or more processors (collectively "processor") 226, supports circuits 228 and bus 230. The memory 224 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like.

The memory 224 may store and/or receive requests from the processor 226 to execute software 232, such as operating system 234. Additionally, the memory 224 may store and/or receive requests from the processor 226 to obtain (i) operands, operators, dimensional values, configurations, and other data that are used by the operating system 234 and the software 232 to control the operation of and/or to facilitate performing the functions of the data acquisition unit 212; and/or (ii) one or more records or other data structures (collectively, "records") 236.sub.i-236.sub.n.

Each of the records 236.sub.i-236.sub.n may be stored as or in a single file or a plurality of files, and may be structured as text, a table, a database, a distributed hash table, a distributed concurrent object store, a document formed using a markup or markup-like language, and the like. The records 236.sub.i-236.sub.n may include, for example, a deposited-material record 236.sub.j. The deposited-material record 236.sub.j may store, be populated with or otherwise adapted to hold the deposited-material measure as determined by the load determining device 210.

The processor 226 may execute (e.g., launch, generate, run, maintain, etc.) and/or operate on the operating system ("OS") 234. The processor 226 may be capable of (i) executing the software 232; (ii) storing the records 236.sub.i-236.sub.n in the memory 224; (iii) dispatching to the host 206 the records 236.sub.i-236.sub.n (including the deposited-material record 236.sub.j) for further processing; (iv) issuing triggers and/or (v) issuing one or more commands and/or instructions to cause the further processing of records 236.sub.i-236.sub.n. Examples of the processor 226 include conventional processors, microprocessors, multi-core processors, microcontrollers and the like.

The support circuits 228 facilitate operation of the processor 226 and may include well-known circuitry or circuits, including, for example, an I/O interface; one or more network-interface units ("NIUs"); cache; clock circuits; power supplies; and the like. The NIUs may be adapted for communicating over any of, any multiple of, any combination of or any combination of multiples of terrestrial wireless, satellite, and/or wireline media. The processor 226 (and in turn, the data-acquisition unit 212) may use the NIUs for exchanging content with the host 206 via network 216.

The bus 230 provides for transmissions of digital information among the processor 226, the memory 224, support circuits 228 and other portions of the data acquisition unit 212 (shown and not shown). The I/O interface is adapted to control transmissions of digital information between (shown and not shown) components of the data acquisition unit 212. In addition, the I/O interface is adapted to control transmissions of digital information between I/O devices disposed within, associated with or otherwise attached to the data acquisition unit 212. Examples of the I/O devices include the I/O device 222, the monitor 220, and any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) the like.

The operating system 234 may include code for operating the data acquisition unit 212 and for providing a platform onto which the software 232 can be executed. The software 232 may include data-acquisition software, which may carry out the acquisition of and storage of the deposited-material measure into the deposited-material record 236.sub.j. The data-acquisition software may also communicate the deposited-material record 236.sub.j to the host 206 using, for example, the communication and/or security protocols compatible with the data acquisition unit 212 and the host 206. To facilitate this, the data-acquisition software may include code to allow the data-acquisition software (and/or the data acquisition unit 212) to substantiate its identity, and in turn, receive authorization to access (e.g., view, configure, use and/or execute) services of the host 206.

The host 206 may include one or more servers, including a host server 238. The host server 238 may be deployed in one or more general computers (for example, as shown in FIG. 1) or specialty purpose computers, personal computers, mainframes, minicomputers, server-type computers and/or any a processor-based platform that operates on any suitable operating system, such as Microsoft® Windows® and/or Linux; and that is capable of executing software.

Like the data acquisition unit 212, the host server 238 may include a large number of elements; most of which are not shown in FIG. 1 for simplicity of exposition. The elements of host server 238 may be formed in a single unitary device and concentrated on a single server, client, peer or other type node. Alternatively, the elements of the host server 238 may be formed from two or more separate devices, and as such, may be distributed among a number of server, client, peer or other type nodes.

The host server 238 may be deployed in accordance with the scale-up and/or scale-out approaches. Using the scale-up approach, the host server 238 may increase its processing power, amount of memory and number of networkable connections by utilizing a symmetrical, multi-processor architecture so as to provide additional capacity. A benefit of this scale-up approach is that such approach provides for simplified configuration and management as compared to the scale-out approach. Using the scale-out approach, the host server 238 may increase its processing power, amount of memory and number of networkable connections by incrementally adding and/or removing capacity as needed, balancing workload across multiple processors, multiple servers, dedicating specific processors and/or servers for performing specific tasks, using physical or logical servers (e.g., a multi-node cluster approach), etc.

As shown, the host server 238 includes one or more processing units (collectively "processor") 240, memory 242, supports circuits 244 and bus 246. The processor 240 may be one or more conventional processors, microprocessors, multi-core processors, microcontrollers and the like.

The bus 246 provides for transmissions of digital information among the processor 240, memory 242 and support circuits 244 and other (not shown) portions of the host server 238. The support circuits 244 facilitate operation of the processor 240, and may include well-known circuitry or circuits, including, for example, one or more input/output I/O interfaces; one or more NIUs; cache; clock circuits; power supplies and the like.

The I/O interface provides an interface to control the transmissions of digital information among (shown and not shown) components of host server 238. In addition, the I/O interface provides an interface to control the transmissions of digital information among I/O devices 239 associated with or otherwise attached to the host server 238. The I/O devices 239 may be embodied as any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; (vii) a key-in device, such as a keyboard or a touchpad, (viii) and the like.

The NIUs facilitate exchange (e.g., sending and/or receiving) of content. Accordingly, the NIUs may be adapted for communicating over terrestrial wireless, satellite, and/or wireline media.

The memory 242 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like. The memory 224 may store and/or receive requests from the processor 240 to execute various software packages, such as operating system 248, application-server software 250 and web-server software 252.

Additionally, the memory 242 may store and/or receive requests from the processor 240 to obtain the records 236.sub.i-236.sub.n (e.g., copies thereof). As above, each of the records 236.sub.i-236.sub.n may be stored as or in a single file or a plurality of files, and may be structured as text, a table, a database, a distributed hash table, a distributed concurrent object store, a document formed using a markup or markup-like language, and the like. The records 236.sub.i-236.sub.n may be stored, for example, using a Microsoft SQL Server and accessible through an ODBC connection.

Like the records 236.sub.i-236.sub.n, the memory 242 may store and/or receive requests from the processor 240 to obtain operands, operators, dimensional values, configurations, and other data that are used by the various software packages to control the operation of and/or to facilitate performing the functions of the host server 238 and/or the host 206.

The application-server software 250, when executed by the processor 240, is operable to (i) communicate with the data acquisition unit 212, via the network 216, to obtain the deposited-material record 236.sub.j; and determine a value associated with the deposited-material measure stored in the deposited-material record 236.sub.j. In addition, the application-server software 250, when executed by the processor 240, is operable to associate the value to a credit, which may be redeemable by the entity; post the credit to the credit to a user account associated with the entity ("entity account"); and provide the web-server software 252 with access to the entity account.

The web-server software 252, when executed by the processor 240, is operable provide on one or more web pages to allow the entity to access the entity account, and in turn, the credit and other information associated with the recycling activities. For example, web-server software 252 may post the credit on the web pages that are accessible to an entity via the user device 207 and entity account, so as to enable the entity to view details of the entity account. The details of the entity account may include the credit (and/or previously accrued credits) associated with the recycling activities of the deposited (and/or previously deposited) material, dates associated with the recycling activities, quantities of the deposited and (previously deposited) material recycled over a given period of time; debits from the credit (and/or previously accrued credits), detailed history of spending of the credit (and/or previously accrued credits), any orders for vouchers for redeemed credits, and the like.

In addition, the web-server software 252, when executed by the processor 240, is operable to allow the entity, via the user device 207, to redeem the credit. This may include the web-server software 252 providing a portal to retailers to allow the entity to redeem the credit (and/or previously accrued credits) at the retailers to obtain goods, services, coupons valued for goods or services, other benefits or discounts, and the like.

The web-server software 252 may also be operable to allow the entity to transform the credit (and/or previously accrued credits) into one or more vouchers that may be spent at the participating retailers or donated to some other entity. To facilitate this, the web-server software 252 includes code to allow the entity to (i) order the vouchers for delivery by mail, email or other communication medium; (i) provide information to the entity via the user device 207 to allow the entity to print or otherwise reduce to physical form, store it on the user device 207 or a peripheral device coupled to the user device 207 (e.g., a PDA, memory device, etc.).

The user device 207 may be, for example, any of or any combination of a general computer (for example, as shown in FIG. 1), a personal computer; a portable computer, a handheld computer; a mobile phone, a digital assistant, a personal digital assistant, a cellular phone, a smart phone, a pager, a digital tablet, a laptop computer, an Internet appliance and the like. In general, the user device 207 may include a processor-based platform that operates on any suitable operating system, such as Microsoft® Windows®, Linux and/or Symbian; and that is capable of executing software.

The user device 207 may, however, include a large number of elements; many of which are not shown in FIG. 2 for simplicity of exposition. The user device 207 includes elements similar to the data acquisition unit 212, except as described herein below. The user device 207 may be formed in a single unitary device and concentrated on a single server, client, peer or other type node. Alternatively, the user device 207 may be formed from one or more separate devices, and as such, may be distributed among a number of server, client, peer or other type nodes. In addition, the user device 207 may be scalable.

As shown, the user device 207 may include a processing platform 209 that is operable to control, manipulate or otherwise interact with a monitor 211 and/or an I/O device 213, via respective couplings. The processing platform 209, the monitor 211 and the I/O device 213 include elements similar to or the same as the processing platform 218, the monitor 220 and the I/O device 222 of the data acquisition unit 212, and as such, the details of such elements are not reproduced here for simplicity of exposition.

The user device 207 is operable to form a user interface through which the entity can access the web pages provided by the web-server software 252. To facilitate this, the user interface may be communicatively coupled with the host server 238 via a network 216. The user interface may be, for example, a graphical-user interface that is operable execute a web browser application for rendering on the monitor 211 the web pages provided by the web-server software 252. As noted, the entity may use the user device 207 to access the users' account, redeem credits and other like functions.

As discussed above, embodiments of the present invention generally relate to systems and methods for managing an incentive-based recycling program. Such types of programs are generally discussed in co-owned patent application publications, 2006/0178933, 2008/0059970, 2008/0169342, 2008/0172298, and 2008/0296374. The disclosures of each of these publications are incorporated herein by reference in their entireties. As contemplated by embodiments of the present invention, the systems and methods described herein are intended to be suitable for use with any of the incentive-based recycling methods, systems or programs described in any of these publications.

Figure 3:
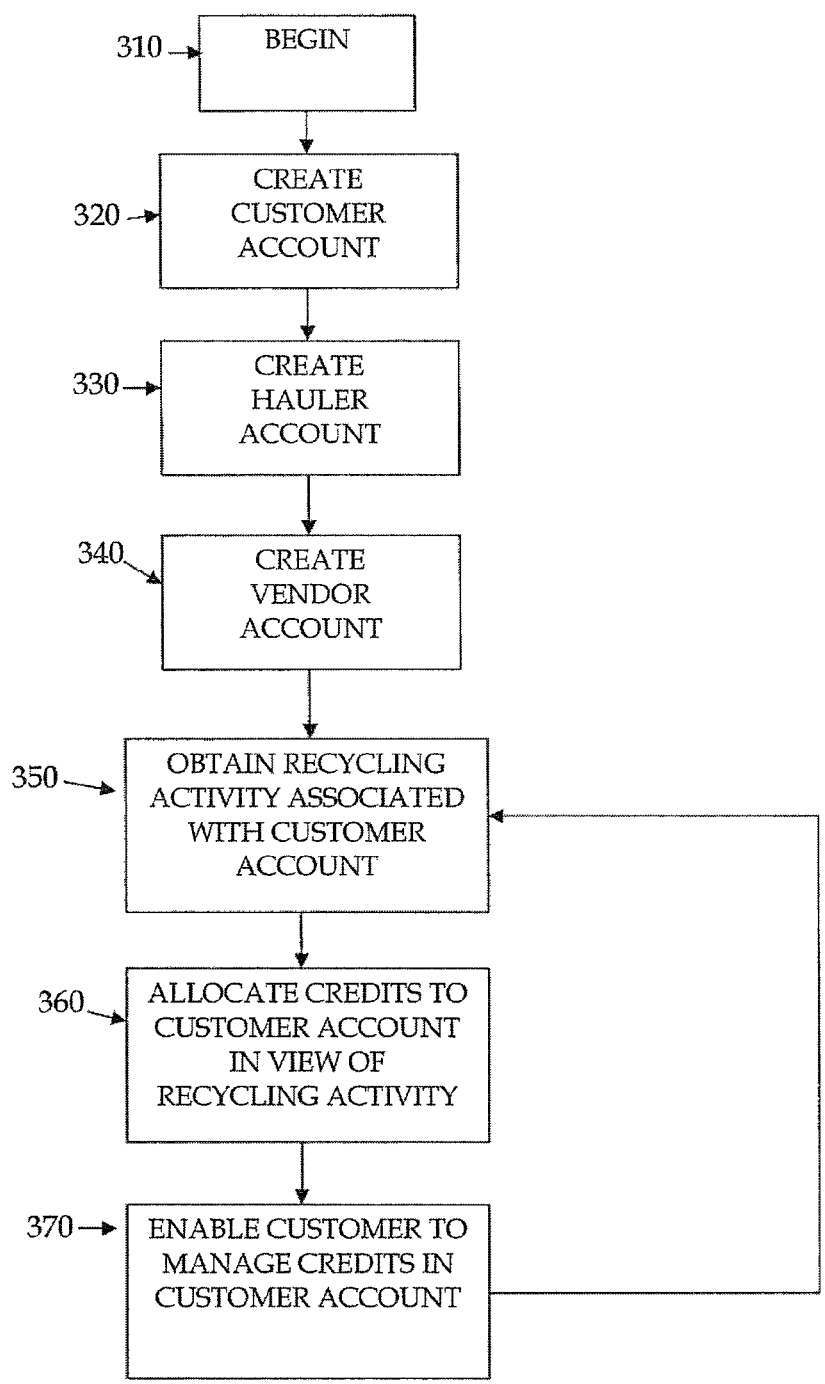
FIG. 3 depicts a flowchart of an exemplary method in accordance with one embodiment of the present invention.

FIG. 3 depicts a flowchart of an exemplary method in accordance with one embodiment of the present invention. The method 300 begins at step 310. At step 320, the administrator of the incentive-based recycling program collects customer (also referred to as "entity") data and allows the customer to create a customer account.

In one embodiment, the collection of customer data comprising obtaining customer information relating to personal identity (e.g., business name, contact person, head of household, etc.), geographical location (e.g., address, floor in building, town, state, etc.) and the like. In several embodiments, the customer provides this information through answers to interrogatories, often in an online form. In some embodiments, a customer may be auto-enrolled into a customer account through its municipality, hauler (discussed below) or an affiliate partner.

In certain instances, for example, in a curb-side pickup program launched in a municipality, to create the customer account, the customer must receive the appropriate equipment or tools before such account can be formally activated. In one embodiment, once the customer's information is collected, the hauler is instructed to deliver a recycling bin to the customer at the customer address. The recycling bin may comprise a unique identifier, e.g., an alphanumeric code to be linked to the customer identity and/or address, which may be embodied in an RFID tag, barcode tag, or other known identifying means, affixed to the outside of the recycling bin. In other types of incentive-based recycling programs, the unique identifier may be provided in different mediums, for example, a key fob, an access card, etc.

In the exemplary embodiment above, once the unique identifier is received, the customer may log into the administrative website, and in the appropriate inquiry box, associate the unique identifier with the customer's other input information. Once confirmed, the customer's account is created. Once this is complete, the system is able to relate any materials placed in the recycling bin with the appropriate customer.

At step 330, the administrator of the incentive-based recycling program collects hauler data and allows the hauler to create a hauler account. In accordance with various embodiments of the present invention, and in particular, the various types of incentive-based recycling programs discussed in the co-owned publications listed above, a "hauler" may constitute any number of various entities, persons, or definitions. For example, in a curb-side incentive-based recycling program, a hauler comprises the company or entity operating the vehicles which collect the recycling bins and recyclable materials therein during periodic collection routes. In another embodiment, the "hauler" comprises the drop-off facility where customers in a particular locality are required to drop-off recyclable materials at a specific location (i.e., building, dumpster, etc.). In another embodiment, where the incentive-based recycling program requires a customer to engage in self-recording/reporting and subsequently recycle recyclable materials in a traditional model, the "hauler" and the customer may be one in the same entities. In yet another exemplary embodiment, where the incentive-based recycling program involves rewarding entities for engaging in environmentally conscious behavior (e.g., using reusable cloth bags at a grocery store, driving a non-gasoline driven automobile, etc.) the "hauler" may comprise a "vendor" as discussed below.

In many embodiments, the hauler and the administrator are engaged in a significant contractual relationship, whereby extensive information is already known by the administrator about the hauler before the hauler is allowed access to the system. In such instances, the administrator may create a hauler account from such identity and contractual information. In other instances, the hauler may be required to create its own account and provide information, in a manner similar to the customer above.

Once the hauler account is created, the administrator of the system may associate each of the customers within a particular municipality or locale with the hauler for such municipality or locale. That is, each hauler may be provided data entry access to individual customer accounts for purposes of reporting/recording specific recycling activity associated with each of the customers, as discussed below.

At step 340, the administrator of the incentive-based recycling program collects vendor data and allows the vendor to create a vendor account. As understood by embodiments of the present invention, the vendor may comprise any third-party entity, associated with the incentive-based recycling program, offering any service or good in exchange for credits held by a customer, valuable only through the incentive-based recycling program. By such definition, a vendor comprises any retail store, including clothing, grocery, electronics, etc., any service provider, including personal services (e.g., hair care, medical, etc.), professional services (e.g., medical, legal, etc.), utility/home services (e.g., telephone, electricity, water, cable, etc.), or the like.

Similar to the hauler, the vendor and the administrator are generally engaged in a significant contractual relationship, whereby extensive information is already known by the administrator about the vendor before the vendor is allowed access to the system. In some embodiments, however, the vendor may be allowed to "sign-up" for the incentive-based recycling program, similar to the customer above.

In accordance with embodiments of the present invention, a vendor may be generally associated with the system, such that all customers may access the vendor and redeem respective customer credits with the vendor. Alternatively, the vendor may be customer-, or location-, specific, such that only a particular group of customers (e.g., residential, commercial, etc.) or particular geographic set of customers (e.g., by state, by municipality, etc.) can redeem credits with the vendor.

At step 350, the administrator obtains and records recycling activity for a customer, as provided by a hauler, in the system. Specific discussions of how a recycling activity (e.g., a quantitative or qualitative measurement of recyclable materials recycled by a customer, etc.) is reported and recorded to the system are disclosed in each of the aforementioned publications, which are again incorporated by reference in their entirety herein. In one exemplary embodiment, a recycling activity of a particular customer is reported to the system from a hauler, as the hauler collects recyclable materials from the customer. In another exemplary embodiment, a recycling activity of a particular customer is reported to the system from a hauler, as the customer engages in an environmentally conscious activity.

At step 360, a credit is awarded to the customer in response to the customer's recycling activity. A discussion of one specific embodiment, relating to how such credit is awarded to the customer in a curb-side pickup incentive-based recycling program, is provided herein, with respect to FIG. 2 where applicable.

As recyclable materials are collected by the collection vehicle 204, a measurement of the deposited materials ("deposit-material measure") is collected. After determining the deposited-material measure, the load-determining device 210 transfers the deposited-material measure to the data acquisition unit 212. This may be done in response to a query by the data acquisition unit 212 and/or upon being triggered as a result of a condition, such as in response to one or more manipulations of the I/O device 222 of the data acquisition unit 212 by the operator or other impetus. After transfer, the data acquisition unit 212 stores the deposited-material measure in the deposited-material record $236_j$ for later dispatch to the host 206. The data acquisition unit 212 may obtains the deposited-material measure in other ways as well.

Subsequently, the data acquisition unit 212 dispatches the deposited-material measure to the host 206 for further processing. The data acquisition unit 212 may do this, for example, by dispatching the deposited-material record 236$_j$ to the host 206. The dispatch may be carried out in response to a query by the host 206 and/or upon being triggered as a result of a condition, such as in response to one or more manipulations of the I/O device 222 of the data acquisition unit 212 by the operator or other impetus. Alternatively, the data acquisition unit 212 may dispatch the deposited-material record 236$_j$ on a periodic basis using, for example, a routine for synchronizing and/or replicating the deposited-material record 236$_j$ on the host 206.

The host 206 then uses the host server 238 and application-server software 250 to determine a value associated with the deposited-material measure stored in the deposited-material record 236$j$. To facilitate this, the host server 238 and application-server software 250 first obtain the deposited-material record 236$j$ from the data-acquisition unit 212. The application-server software 250 may obtain the deposited-material record 236$j$ using the routine for synchronizing and/or replicating the deposited-material record 236J on the data-acquisition unit 212. Alternatively, the application-server software 250 may obtain the deposited-material record 236$j$ via an upload over the network 216. The upload may be handled, for example, by a ColdFusion MX backend executing on the application-server software 250. Using Cold Fusion Markup Language (CFML), the ColdFusion MX backend parses, where appropriate, and stores the deposited-material record 236$j$ in memory 242.

As noted above, the value associated with the deposited-material measure may be financial (e.g., monetary or economic). For example, the value may be based, at least in part, on an amount of the deposited material. Alternatively. The value may be based, at least in part, upon financial offerings of one of more retailers participating in a rewards program ("participating retailers"). The value may have a minimum and/or a maximum. The maximum may be based on time (e.g., no more than "x" for a given period of time).

To facilitate determining the value, the application-server software 150 may employ database software along with a database and algorithms that form one or more models for assigning the value to the deposited-material measure. In a first exemplary embodiment, the value may be assigned by the fact a participant recycled any amount. In another exemplary embodiment, the value may be assigned correlating to the amount a participant recycled in a given period of time. Alternative exemplary embodiments contemplate combinations of the above, as well as similar predetermined algorithms. The database software in combination with the database and algorithms may provide flexibility in applying different rates for determining the value. These rates may differ based on availability of the financial offerings, the type of entity, geographic area of the entity, and other demographics. The rates may be applied so that the entities receive an optimum incentive to for recycling the recyclable materials.

The application-server software 250 may then associate a credit to the value. To facilitate determining the credit, the application-server software 250 may employ the database software along with the database and algorithms that form one or more models for determining and associating a credit to the value to the deposited-material measure.

After the application-server software 250 posts credit to the entity account, the web-server software 252 posts account (and in, turn, the credit) on a web page to allow the entity to access the credit and the other information associated with the recycling activities. To facilitate this, the web-server software 252 obtains account, and in turn, the credit and the other information associated with the recycling activities, from the application-server software 250. The web-server software 252 may obtain the credit and the other information in response to a query by the web-server software 252 and/or upon being triggered as a result of a condition, such as in response to the application-server software 250 pushing such information to the web-server software 252.

A customer may obtain credits through a variety of different recycling activities. In one embodiment, a recycling activity comprises the proper disposal of recyclable materials in a recycling bin or container, as discussed above. In another embodiment, a recycling activity comprises a customer contribution to an environmentally conscious activity (e.g., reusing cloth bags at a grocery store, cutting back on energy/water usage, purchasing goods from second-hand shops, and the like). In yet another embodiment, a recycling activity comprises engaging in an environmental promotional activity (e.g., using a credit card which is dedicated to environmental awareness, attending a particular seminar on environmental education, etc.). Alternative recycling activities may include any type of activity which betters the environment through education or promotion of reusable or recyclable materials, conversation of natural resources, or the like.

At step 370, the system allows the customer to manage the customer's account, including managing any credits associated therewith. Generally, included in the management of the customer account, is the customer's ability to engage in certain credit-involved transactions, including, but not limited to: vendor redemption, auctions, sweepstakes, donations, transfers, and purchases (i.e., self-purchase or gift purchase).

In one embodiment, the customer is able to redeem the credits associated with the customer account at a participating vendor. Each vendor may have a different value associated with a credit unit, and as such, each vendor may allow customers to redeem credits in various ways. For example, some vendors may provide a credit to dollar association (e.g., 10 credits equals up to 1 dollar value with the vendor), other vendors may provide a product to credit value (e.g., in exchange for 10 credits, the customer receives one free widget), other vendors may provide an additional purchase value to the credit value (e.g., in exchange for 10 credits, the customer may buy one get one free), and other vendors may provide a discount to credit value (e.g., 10% off entire purchase in exchange for 10 credits). Other similar value scenarios may exist as well.

Generally, the vendor will provide a shopping forum either through an online store via a computer network or in a traditional retail store. If the customer wishes to redeem credits with the vendor through an online store, access may generally be provided through a redemption link on the customer's account, hosted by the administrator. In some embodiments, however, it may be necessary for the customer to go to a website hosted by the vendor, and utilizing a virtual certificate, coupon, or similar identification code, and enter such code before redemption of credits is allowed. In a traditional retail store environment, it is generally necessary for the user to print a physical coupon or certificate, having an identification code, and bring the coupon or certificate with the customer at the time of purchase/redemption.

In another embodiment, a customer may be able to participate in an auction, or virtual auction, utilizing credits from the customer's account. For example, similar to eBay® auctions, in a time-controlled virtual setting, a customer may bid against other customers for a particular item or service, by using earned credits as units of value for the bid. In another example, a customer may participate in a virtual live auction, whereby a virtual auctioneer accepts bids as customers directly attempt to outbid each other, and the auction continues until no participant wishes to outbid the highest bidder. Whereas, an auction setting ultimately results in the sale of a good or service, embodiments of the present invention may be applicable to any good or service feasible without departing from the scope and nature of the systems and methods herein. Given the complexity of an auction system, the administrator may team with a third party to host and administer the auction, and directly link results through the administrator, as if the auction were hosted within the system.

In yet another embodiment, a customer may be able to participate in a sweepstakes to either earn more credits or a prize with no risk necessary, to risk credits to earn more credits or a prize. In accordance with embodiments of the present invention, a sweepstakes may be held within the system for any number of reasons, for example, to promote environmental consciousness. Customers may be able to participate in the sweepstakes for the chance to earn credits and/or a prize. Often the sweepstakes may be sponsored by either the administrator or one or more vendors. In most embodiments, a customer may be entered in the sweepstakes by merely remaining active on a customer account (e.g., a recycling activity must be recorded for that customer within a particular time period). Alternatively, in some embodiments, a customer may be required to risk credits to enter the sweepstakes. As with most sweepstakes-type promotions, from the multitude of customers entered, only one or a few (in a hierarchy-type order, i.e., $1^{st}$, $2^{nd}$, $3^{rd}$, etc.) winner of the sweepstakes is declared. The sweepstakes may involve any type of prize feasible within the scope of the embodiments of the present invention.

In another embodiment of the present invention, a customer may be able to donate credits to a charitable organization, educational facility, non-profit group, or the like. For example, the administrator or a third party may wish to associate a particular cash value per credit (independent of any assessment by any other vendor) (e.g., $1 for 100 credits). The customer may be able to utilize the credits associated with the customer's account, and allocate the associated cash value to the particular charity, educational facility, or non-profit group. In certain embodiments, the customer may be able to receive a tax deductible certificate for the cash value, as evidence of such donation.

Similarly, in another embodiment, a corporation or other entity may sponsor a matching donation, whereby every donation made by a customer to a particular cause will be matched (halved, doubled, tripled, etc.) by the corporation. Providing such matching allows for a corporate sponsorship of a particular cause, and to allow customers an opportunity to effectively enhance their contribution to the cause.

In yet another embodiment of the present invention, a customer may be able to transfer credits to another customer's account. Similar to the donation above, a customer may elect to have any or all credits associated with that customer's account transferred to another customer's account, subsequently giving up any right to those credits and the value associated therewith. For example, a first customer may be neighbors with a second customer, and have knowledge of the second customer's devotion to the incentive-based recycling program and to the promotion of the same through other neighbors and friends. To show the second customer appreciation for his/her efforts to promote recycling, the first customer decides to transfer all of his/her credits to the second customer. Once such request is made, the administrator may notify the second customer of the first customer's transfer of credits to the second customer's account.

In an additional embodiment, a customer may also purchase additional credits for the customer's own account or for another customer's account. For example, in certain instances a customer may be trying to save up credits in order to redeem them for a particular vendor's redemption special (e.g., for this week only, a television costing only 500 credits). Once the customer realizes it may not be possible to accumulate enough credits before the special is over, the customer may be able to purchase (using a credit card or other purchasing means) any number of credits for a particular cash value. Whereas the distribution of credits is an action between the administrator and the customer, the administrator may decide the cash value to purchase credits (e.g., 1 credit costs 1 dollar). Similarly, a customer may purchase credits as a gift for another customer. Similar to the donation of credits above, a gift purchase of credits may be transferred to any customer for any reason. This embodiment may also be utilized in a scenario where a non-customer wishes to give a gift to an active customer of credits. Thus, in certain embodiments, the ability to purchase credits may be widely available to the public, and may be sent out as virtual gift cards/coupons.

Once the step 370 is completed in a particular instance, the method 300 may generally revert back to step 350, whereby a customer's recycling activity is recorded, thus prompting additional credits to be awarded. However, as understood by embodiments of the present invention, whereas new haulers and vendors may frequently be entering (or leaving) the system, the method 300 is not intended to be limited to a certain progression of steps, and each of the steps laid out in the method 300 may be completed in any order or currently, in real time, with any other step.

In accordance with embodiments of the present invention, additional administrative tools may be provided to better enable the administrator to monitor and administrate the system. For example, whereby the multitude of transactions occurring on a regular basis within the system involves money or financially valuable credits, the system may be provided with significant fraud detection tools, to immediately suspend and/or alert appropriate authorities of any potentially fraudulent activity. Such fraud detection may include identity verification steps (for any redemption or purchase transaction), prepayment accounts (e.g., money/credits held in trust for corporate matching purposes), appropriate delay before authorization (e.g., no authorization for redemption or purchase is granted without supplemental approval via email, a secondary pin for all transactions, or a sufficient waiting period to ensure no attempts to subsequently cancel a credit card or notify the administrator of a "hacked" account are made), and the like.

Another exemplary administrative tool comprises a customer care center, whereby any participating entity (i.e., customer, vendor, hauler, etc.) may utilize a care center to better utilize the systems services and components. For example, the customer care center may comprise a virtual help function/icon (i.e., avatar) to assist with all features of the system. Such help function may be suitable to answer most frequently asked questions about how a particular service or function is performed within the general administration of the system. In another example, a 24-hour hotline may be provided, monitored and administered by the administrator of the system, for any person to contact the administrator for assistance. Other administrative tools are either inherent in each of the functions discussed herein, or explained in greater detail in any of the publications disclosed above, which have been incorporated herein by reference in their entireties.

It should be noted that any process descriptions or blocks in flow diagrams should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

It should also be emphasized that the above-described embodiments of the present invention are merely possible examples of implementations, merely set forth for a clear understanding of the principles of the invention. Many variations and modifications may be made to the above-described embodiments) of the invention without departing substantially from the spirit and principles of the invention. All such modifications and variations are intended to be included herein within the scope of this disclosure and the present invention and protected by the following claims.

What is claimed:

1. A method of encouraging a plurality of customers to dispose of recyclable material of at least one of a plurality of types using at least one collector vehicle and one or more containers, each container holding a quantifiable measure of the recyclable material, the method comprising the steps of:
    affixing, to the one or more containers, an identifier identifying the recyclable material in the container and a respective customer of the plurality of customers who is associated with the container;
    providing, on the at least one collector vehicle a load determining device connected to a data acquisition unit communicatively coupled to a network and the load determining device, and a tag reader coupled to the data acquisition unit;
    collecting, by the collector vehicle, recyclable material at periodic collection routes;
    acquiring by the tag reader, from the identifier of each of the one or more containers an identity of the customer associated with the container, and by the load determining device, a quantifiable measure of the recyclable material in each of the one or more containers;
    receiving, by a server connected to the data acquisition unit via the network, the acquired identity of the customer associated with the container, and the acquired quantifiable measure of the recyclable material in each of the one or more containers; and
    the server using at least one of one or more models, for each of the plurality of customers for:
        determining a value based at least in part on the quantifiable measure acquired from the one or more containers associated with the customer and correlated to a total amount of deposited recyclable material in a given past time period;
        allocating, to the customer, credits based on the value; and
        posting, to a customer account associated with the customer, a monetary value of the allocated credits.

2. The method of claim 1, further comprising a step of generating the customer account for each of the plurality of customers, the customer account comprises a unique identifier.

3. The method of claim 2, wherein the unique identifier is an alphanumeric code positioned on any of the identifier, a recycling bin, a key fob, and an access card.

4. The method of claim 2, wherein the unique identifier is electronically stored within the identifier.

5. The method of claim 1, further comprising a step of quantifying a recycling activity of the plurality of customers, the recycling activity comprises at least one of
    providing the recyclable material to fill the one or more containers,
    engaging in an environmentally-conscious activity, and
    utilizing at least one service pre-designated as an acceptable recycling activity.

6. The method of claim 5, wherein the step of allocating, allocates the credits in an amount correlating to the recycling activity associated with the customer, and comprises the steps of:
    converting the determined value into the credits; and
    associating the credits with the customer account.

7. The method of claim 2, further comprising a step of redeeming the credits by:
    providing access to information pertaining to the customer account, including the value of the credits posted the customer account; and
    enabling the customer to
        receive the monetary value of the credits from a third party vendor,
        participate in an auction and in sweepstakes using the credits,
        donate the credits to at least a charitable, educational or non-profit organization,
        transfer the credits to another customer of the plurality of customers, and purchase additional credits.

8. The method of claim 7, wherein the redeeming of the credits at the third party vendor further comprises a step of applying the credits at a vender-determined value towards a purchase.

9. A system for encouraging a plurality of customers to recycle material of at least one of a plurality of types using at least one collector vehicle and one or more containers, each container holding a quantifiable measure of the recyclable material, the system comprising:
    the one or more containers having an affixed identifier identifying the recyclable material in the container and a respective customer of the plurality of customers who is associated with the container;
    the at least one collector vehicle having a load determining device and a data acquisition unit communicatively coupled to a network and the load determining device connected to a data acquisition unit communicatively coupled to a network and the load determining device, and a tag reader coupled to the data acquisition unit, the at least one collector vehicle collects recyclable material at periodic collection routes;
    the tag reader acquires from the identifier of each of the one or more containers an identity of the customer associated with each of the one or more containers;

the load determining device acquires a quantifiable measure of the recyclable material in each of the one or more containers;

a server accessible via a network and including a processor, the processor receives the acquired identity of the customer associated with the container, and the acquired quantifiable measure of the recyclable material in each of the one or more containers; and using at least one of one or more models;

determines, for each of the plurality of customers, a value based at least in part on the quantifiable measure from the one or more containers associated with the customer and correlated to a total amount of deposited recyclable material in a given past time period;

allocates to the customer, credits based on the value; and posts, to a customer account associated with the customer, a monetary value of the allocated credits.

10. The system of claim 9, wherein the processor is further generates the customer account for each of the plurality of customers, the customer account comprises a unique identifier.

11. The system of claim 9, wherein the processor is further quantifies a recycling activity of the plurality of customers, the recycling activity comprises at least one of providing the recyclable material to fill the one or more containers, engaging in an environmentally-conscious activity, and utilizing at least one service pre-designated as an acceptable recycling activity.

12. The system of claim 11, wherein the credits to the customer account, are allocated in an amount correlating to the recycling activity associated with the customer by:

converting the determined value into the credits; and associating the credits with the customer account.

13. The system of claim 10, wherein the processor further redeems the credits and provides information pertaining to the customer account, including the value of the credits posted the customer account; and enables the customer to receive the monetary value of the credits from a third party vendor, participate in an auction and in sweepstakes, donate the credits to at least a charitable, educational or non-profit organization, transfer the credits to another customer of the plurality of customers, and purchase additional credits.

14. The system of claim 13, wherein the redeeming of the credits at the third party vendor comprises applying the credits at a vender-determined value towards a purchase.

15. The method of claim 2, wherein the unique identifier is an alphanumeric code positioned on a recycling bin, a key fob, or an access card.

16. The method of claim 2, wherein the unique identifier is electronically stored within an RFID tag or a barcode on an outside of each of the one or more containers.

* * * * *